No. 776,491. PATENTED DEC. 6, 1904.
W. H. BRISTOL.
TEMPERATURE COMPENSATING DEVICE FOR ELECTRICAL MEASURING INSTRUMENTS.
APPLICATION FILED FEB. 23, 1904.
NO MODEL.

WITNESSES:
Chas. W. Thomas
Raena H. Yudizky

INVENTOR:
William H. Bristol
BY
ATTORNEY

No. 776,491. Patented December 6, 1904.

UNITED STATES PATENT OFFICE.

WILLIAM H. BRISTOL, OF HOBOKEN, NEW JERSEY.

TEMPERATURE-COMPENSATING DEVICE FOR ELECTRICAL MEASURING INSTRUMENTS.

SPECIFICATION forming part of Letters Patent No. 776,491, dated December 6, 1904.

Application filed February 23, 1904. Serial No. 194,839. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Temperature-Compensating Devices for Electrical Measuring Instruments, of which the following is a specification.

My invention has reference to a device for automatically maintaining constant electrical resistance in a circuit for the purpose of obtaining accurate readings at the measuring instrument despite changes in temperature occurring at or near the measuring instrument.

In my prior patent, No. 514,258, dated February 6, 1894, I show an electrical temperature-compensating device consisting of a resistance and a thermometric device automatically maintaining the resistance constant under variations in temperature. This compensating device was more particularly intended for circuits of high electromotive force or voltage, while one of the special objects of my present invention is to provide a device for automatically compensating for changes of resistance in the conductors leading to delicate electrical measuring instruments—such, for instance, as millivoltmeters or other instruments for the measurements of currents of low voltage—such, for instance, as those produced by thermo-electric couples used individually or as part of pyrometers and like instruments.

With the above object in view my invention consists, essentially, in the combination, with a measuring instrument having a low-resistance coil, of a circuit, a conducting-column surrounding a portion of the circuit and adapted to short-circuit portions of said circuit with increase of temperature, and vice versa, it being understood that with ordinary metallic conductors the resistance increases with augmented temperature.

My invention also consists in novel features in the construction of the temperature-compensating device and its application to circuits of high voltage.

The nature of my invention will be best understood when described in connection with the accompanying drawings, in which—

Figure 1:
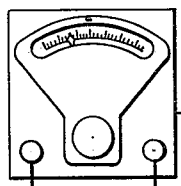
Figure 1:
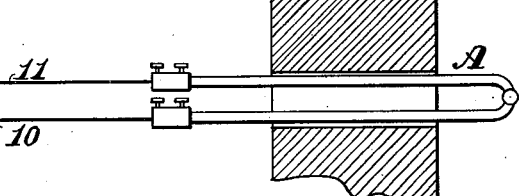

Figure 1 represents a diagrammatic view of an electrical apparatus to which my invention is applied. Figs. 2, 3, 4, 5, and 6 illustrate different forms for the thermometric compensating device.

Similar letters and numerals of reference designate corresponding parts throughout the several views of the drawings.

Referring now to the drawings, the letter A designates a thermo-electric couple or other source or generator of electricity supplying a current of low voltage.

B is the indicating, measuring, or recording device of a usual construction, but preferably provided with a coil (not shown) of low resistance—say, for instance, one ohm instead of two hundred or more ohms, as usual in instruments of this character—thus rendering the instrument extremely sensitive to slight changes in the electromotive force of the current. Under ordinary circumstances such an instrument is strongly influenced by changes of resistance in the conductors due to variations in temperature, and its readings are therefore unreliable. For the purpose of rendering such instruments accurate I employ the compensating device C, interpolated in the circuit from the generator A in proximity to the measuring instrument B. In Fig. 1 I have shown this compensating device to consist of a thermometer in the bulb 1, of which is fused or otherwise secured the terminal of one conductor 10, leading from the generator A. In the bore of the thermometer-shank is arranged a rod, wire, or filament 3 of equal or higher resistance than the generator-conductors and which is placed in connection with one of the binding-screws of the indicating, measuring, or recording device B. The other binding-screw of the instrument B is connected by the conductor 11 with the opposite pole of the generator, as usual. The bulb of the thermometer is filled, as usual, with a fluid, such as mercury, offering a cross-section of high conductivity compared with that of the wire, rod, or filament 3. It will readily be understood that as the mercury rises and falls with variations in temperature a corresponding portion of the wire, rod, or filament will be short-circuited, or vice versa, thus decreasing or increasing the resistance in accordance with the length of the filament that is immersed, and so compensating for changes in temperature. It is of course to be understood that the resistance offered by the wire, rod, or filament is so calculated that the increments short-circuited correspond to the difference in resistance caused by increase of temperature.

While I have shown the end of the conductor attached to the bulb, and the filament, wire, or rod inserted from the other end of the thermometer, it is of course to be understood that the conductor 10 could be passed directly through the thermometer and to the binding-post at the measuring instrument B without a break.

Figure 2:
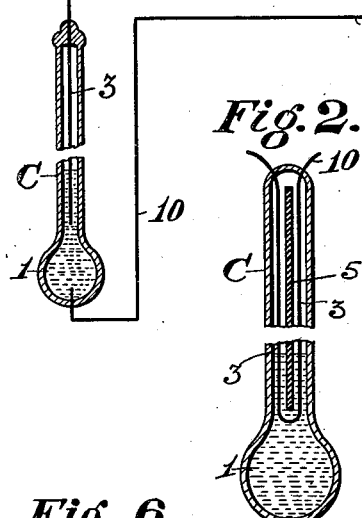
Figure 3:
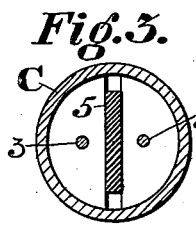
Figure 4:
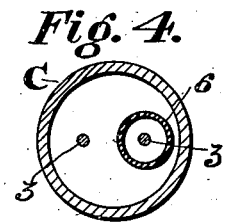

In Figs. 2 and 3 I have shown the wire, rod, or filament in the form of a loop entering the shank of the thermometer and having the two members separated from each other by an insulating-partition 5, of glass or other suitable material, to prevent contact of the same. The free ends of the loop are attached, respectively, to one pole of the generator A and to one binding-post of the measuring instrument. It will be readily understood that with this construction twice the amount of the wire, rod, or filament 3 will be thrown in or cut out with the same variation of the column of mercury in the compensating device shown in Fig. 1. In Fig. 4 I have shown the insulating-partition in the form of a tube 6, surrounding one of the members of the loop.

Figure 6:
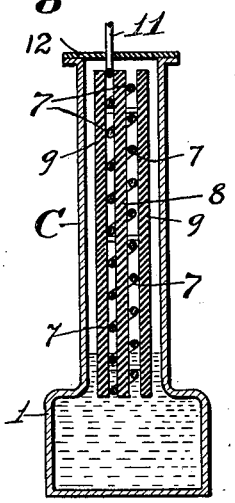
Figure 5:
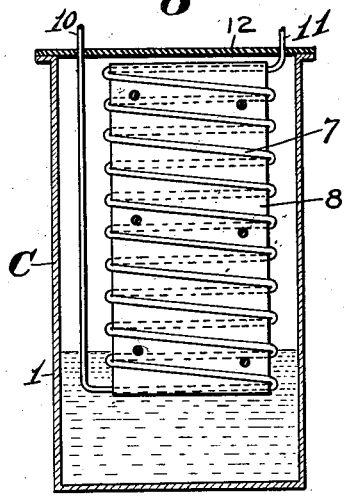

When it is desired to throw in or out a large resistance with a comparatively small change in the height of the mercurial column, I make use of the construction shown in Figs. 5 and 6. In this construction the body of the thermometer is provided with a bulb 1 of considerable length and width, and the shank is formed to correspond, thus permitting the insertion of a coil 7 into the shank. This coil may consist of a large number of windings or convolutions about a core 8 of non-conducting material—such, for instance, as mica—so as to insulate the windings from each other. The terminals of the coil are connected, as before, with one pole of the generator and with one binding-post of the measuring instrument. In practice I prefer to make the body of the thermometer of metal, and therefore make use of means for insulating the coil from the walls thereof. This is best accomplished by the use of mica plates 9, attached to the core 8. The top of the thermometer-body can be hermetically sealed by a suitable cap 12 in the usual manner. Of course if the thermometer-body is made of glass the additional side insulation is not necessary.

While I have herein described the compensating device as more particularly adapted for instruments of low resistance, it can be applied to voltmeters of usual construction to compensate all variations in temperature.

It will be noticed that one of the main features of my present invention is to compensate perfectly without materially increasing the resistance of the circuit.

What I claim as new is—

1. In combination with a generator of electricity and a measuring instrument having a low-resistance coil, a temperature-compensating device located in proximity to the measuring instrument and containing a mercuric column acting on a resistance in series in the circuit for automatically maintaining constant the total resistance of the part of the circuit comprising the measuring instrument and the compensating device under variations in temperature.

2. In combination with a source of current and a measuring instrument, an electrical temperature-compensating device included in series in the circuit and located in proximity to the measuring instrument, the said compensating device consisting of a resistance in a liquid thermometric device automatically maintaining constant the total resistance of the part of the circuit comprised by the measuring instrument and the compensating device under variations in temperature.

3. In combination with a source of current and a measuring instrument, an electrical temperature-compensating device included in series in the circuit and located in proximity to the measuring instrument, the said compensating device consisting of a resistance in a mercurial thermometric device automatically maintaining constant the total resistance of the part of the circuit comprised by the measuring instrument and the compensating device during variations in temperature.

4. In combination with a generator of electricity and a measuring instrument, a mercurial temperature-compensating device located in proximity to the measuring instrument and having a portion of one of the conductors from the generator passing therethrough and placed in communication with the measuring instrument, whereby the total resistance of the part of the circuit comprised by the measuring instrument and the compensating instrument is maintained substantially constant by fluctuations in the column of mercury.

5. In combination with a source of current and a measuring instrument, an electrical temperature-compensating device in series in the circuit and located in proximity to the measuring instrument, the said compensating device consisting of a liquid thermometer having in its shank a looped resistance wire, rod or filament.

6. In combination with a source of current and a measuring instrument, an electrical temperature-compensating device including in series in the circuit and located in proximity to the measuring instrument, the said compensating device consisting of a liquid thermometer having in its shank a looped resistance wire, rod or filament, and means for insulating the wires, rods or filaments from each other.

7. In combination with a source of current and a measuring instrument, an electrical temperature-compensating device including in series in the circuit and located in proximity to the measuring instrument, the said compensating device consisting of a liquid thermometer having in its shank a looped resistance wire, rod or filament, means for insulating the wires, rods or filaments from each other, and means for insulating the same from the body of the thermometer.

8. In combination with a source of current and a measuring instrument, an electrical temperature-compensating device including in series in the circuit and located in proximity to the measuring instrument, the said compensating device consisting of a liquid thermometer having in its shank a series of looped resistances, and means for insulating the looped resistances from each other and from the body of the thermometer.

9. In combination with a source of current and a measuring instrument, an electrical temperature-compensating device including in series in the circuit and located in proximity to the measuring instrument, the said compensating device consisting of a thermometer having its shank of elongated or flattened form transversely and a resistance-coil of flattened form inserted in said shank combined with a mercurial column.

In testimony whereof I have hereunto set my hand in the presence of two subscribing witnesses.

WILLIAM H. BRISTOL.

Witnesses:
A. FABER DU FAUR, Jr.,
RAENA H. YUDIZKY.